United States Patent

Schlemmer et al.

(10) Patent No.: US 10,066,645 B2
(45) Date of Patent: Sep. 4, 2018

(54) TURBINE VALVE ACTUATOR (71) Applicant: Hydac System GmbH, Sulzbach/Saar (DE)

(72) Inventors: Kristof Schlemmer, Saarlouis (DE); Martin Piechnick, Lohr am Main (DE); Wolfgang Britz, Beckingen (DE)

(73) Assignee: HYDAC SYSTEM GMBH, Sulzbach/Saar (DE)

( * ) Notice: Subject to any disclaimer, the term of this patent is extended or adjusted under 35 U.S.C. 154(b) by 482 days.

(21) Appl. No.: 14/443,690

(22) PCT Filed: Oct. 25, 2013

(86) PCT No.: PCT/EP2013/003219
§ 371 (c)(1),
(2) Date: May 19, 2015

(87) PCT Pub. No.: WO2014/079528
PCT Pub. Date: May 30, 2014

(65) Prior Publication Data
US 2015/0275931 A1 Oct. 1, 2015

(30) Foreign Application Priority Data
Nov. 22, 2012 (DE) .................. 10 2012 022 871

(51) Int. Cl.
*F15B 11/08* (2006.01)
*F15B 1/08* (2006.01)
(Continued)

(52) U.S. Cl.
CPC ............... *F15B 11/08* (2013.01); *F02C 9/16* (2013.01); *F15B 1/08* (2013.01); *F15B 15/1476* (2013.01);
(Continued)

(58) Field of Classification Search
CPC ............ F15B 11/08; F15B 15/1476; F15B 2201/4155; F15B 2211/212; F02C 9/16
(Continued)

(56) References Cited

U.S. PATENT DOCUMENTS

| 3,951,575 | A | * | 4/1976 | Motomura | ................. | F04C 2/14 417/283 |
| 4,633,665 | A | * | 1/1987 | Buter | ................. | F15B 1/02 60/413 |
| 8,079,204 | B2 | * | 12/2011 | Coers | ................. | A01D 41/14 56/15.8 |
| 8,567,185 | B1 | * | 10/2013 | Theobald | ................. | B25J 9/144 60/413 |
| 2011/0072821 | A1 | * | 3/2011 | Potten | ................. | F15B 19/00 60/657 |

(Continued)

FOREIGN PATENT DOCUMENTS

DE 1 751 900 7/1971
DE 2 703 201 C2 8/1978
(Continued)

*Primary Examiner* — F. Daniel Lopez
*Assistant Examiner* — Daniel Collins
(74) *Attorney, Agent, or Firm* — Wenderoth, Lind & Ponack, L.L.P.

(57) ABSTRACT

A turbine valve actuator (100) controls a valve unit of a media-operated consumer unit, such as a steam or gas turbine, and has an actuating part drive (102) with a movable actuating part (104), a first media space (106) and a second media space (108). A pressure build up in the first media space (106) attempts to cause a movement of the actuating part (104) in a first direction (R). A pressure build-up in the second media space (108) attempts to cause a movement of the actuating part (104) in an opposing second direction (GR). The first media space (106) can be supplied with a fluid in predeterminable amounts by a supply (110). The second media space (108) is acted upon by a hydraulic accumulator (112) provided with a preload pressure and permanently connected to the second media space (108).

24 Claims, 7 Drawing Sheets"

(51) Int. Cl.
*F15B 15/14* (2006.01)
*F02C 9/16* (2006.01)

(52) U.S. Cl.
CPC ... *F15B 2201/31* (2013.01); *F15B 2201/4155* (2013.01); *F15B 2211/20538* (2013.01); *F15B 2211/20546* (2013.01); *F15B 2211/212* (2013.01); *F15B 2211/31511* (2013.01); *F15B 2211/329* (2013.01); *F15B 2211/513* (2013.01); *F15B 2211/5158* (2013.01); *F15B 2211/526* (2013.01); *F15B 2211/6306* (2013.01); *F15B 2211/6336* (2013.01); *F15B 2211/6343* (2013.01); *F15B 2211/7052* (2013.01); *F15B 2211/7656* (2013.01); *F15B 2211/7716* (2013.01); *F15B 2211/8633* (2013.01); *F15B 2211/8752* (2013.01)

(58) Field of Classification Search
USPC .......................................... 60/413; 92/85 B
See application file for complete search history.

(56) References Cited

U.S. PATENT DOCUMENTS

2011/0268587 A1* 11/2011 Dybing .................. F15B 9/04
                                                        417/213

FOREIGN PATENT DOCUMENTS

| DE | 196 12 717 A1 | 10/1997 |
| DE | 196 47 483 A1 | 5/1998 |
| DE | 10 2004 042 891 B3 | 10/2005 |
| DE | 10 2010 053 811 A1 | 6/2012 |
| EP | 0 151 650 A2 | 8/1985 |
| EP | 0 541 195 A1 | 5/1993 |
| EP | 0 643 814 B1 | 4/1997 |
| EP | 2 276 935 B1 | 1/2012 |

* cited by examiner

1 — Degressive (Belleville washers)
2 — Linear
3 — Progressive (hydraulic accumulator adiabatic)
4 — Constant
5 — Regressive

Fig.7

TURBINE VALVE ACTUATOR

FIELD OF THE INVENTION

The invention relates to a turbine valve actuator for controlling at least one valve unit of a medium-operated consumer unit, such as a steam or gas turbine. The valve actuator an actuating part drive that comprises a movable actuating part, at least one first medium space, and at least one second medium space. A pressure build-up in the first medium space attempts to cause a movement of the actuating part in a first direction. A pressure build-up in the second medium space attempts to cause a movement of the actuating part in an opposing second direction. The first medium space can be supplied with a fluid in predeterminable amounts by a supply device. The second medium space is acted upon by an energy accumulator.

BACKGROUND OF THE INVENTION

Turbine valve actuators are known in the prior art, e.g., from patent document DE 10 2004 042 891 B3. That turbine valve actuator includes a hydraulic working cylinder. A piston rod unit is permanently spring-loaded, preferably by a packet of Belleville washers and is held against the compressive force of the Belleville washers via the system pressure of a fluid circuit in a retracted position. In the event of a system pressure drop, the piston rod unit extends from the working cylinder, and a control valve is activated to control a medium flow to a consumer unit and, in this case, to stop a mass flow of steam for the driving of a steam or gas turbine.

In the known actuating cylinder with mechanical springs, the drive must be designed and manufactured according to the individual requirements of the individual steam valve type.

A subsequent adaptation of the turbine valve actuator to another steam valve is not possible. The end result is a wide variety of types, which is associated with high costs for development, production, storage, and distribution.

SUMMARY OF THE INVENTION

In light of this prior art, the invention addresses the problem of providing an improved turbine valve actuator allowing subsequent adaptation to other steam valves.

This problem is basically solved by a turbine valve actuator where the energy accumulator is at least one hydraulic accumulator provided with a pre-load pressure, which is permanently connected to a second medium space.

The basis of the turbine valve actuator according to the present invention is the use of at least one hydraulic accumulator to control the turbine valve actuator. With the solution according to the present invention, the variety of types can be reduced to a few basic types. The turbine valve actuator can therefore be connected to a wide range of valve units. The advantageous use of piston accumulators as standard components also contributes to reducing costs. Hydraulic accumulators are distinguished by the possibility of the adjustability of its characteristics. The use of hydraulic accumulators that are external, i.e., arranged outside the medium spaces, permits employing interchangeable components, and thus, supports the modularization and adaptability of the turbine valve actuator. Another advantage is that the actuating part drive can be operated in a nearly force-free manner for installation and maintenance.

Advantageously, the actuating part drive is configured as a hydraulic motor or hydraulic working cylinder. In a preferred embodiment, a first medium space forms a rod working space in the hydraulic working cylinder, and the second medium space forms a piston working space within a cylinder housing. The spaces formed are separated from one another by a piston rod unit as an actuating part. Such working cylinders are readily available on the market as linear cylinders in a variety of embodiments. For the purposes of modularization, they can be used as standard components. This use contributes to considerable cost savings in manufacturing. Advantageously, the working cylinder is equipped with an end position damping in the direction of extension.

To close the valve unit in a failsafe operation, the piston rod unit either retracts or extends due to the fluid pressure of the hydraulic accumulator, relative to the cylinder housing, if the fluid pressure drops in the first medium space. Thus, the fluid pressure is to be maintained in the first medium space if the valve unit is to be opened. If, however, the fluid pressure drops in the first medium space for any reason, e.g., because of a failure in the supply device or due to targeted release via a safety valve, then without intervention, this pressure drop leads to a closing of the valve unit and thus to the shutting off of a media flow to a consumer unit downstream of the valve unit.

Furthermore, a pressure-adjusting device can be provided. This pressure-adjusting device makes allows the fluid pressure in the second medium space to be adjusted between a minimum pressure and a maximum pressure in such a manner that the actuating part moves in the unpressurized first medium space in the second direction to an end position, wherein an exceeding of the allowable driving forces is prevented. The pressure-adjusting device consequently maintains the functional readiness of the turbine valve actuator in ongoing operation. The pressure at which the actuating part is acted upon is advantageously coordinated to the downstream valve unit, thus ensuring that the valve unit is closed if there is a pressure drop in the first medium space. Due to the pressure-adjusting device, an overload protector for the valve unit is also provided, because excess pressures in the second medium space can be prevented by releasing the fluid.

Furthermore, the pre-load pressure can also be adjusted on a gas side of the hydraulic accumulator, by using a pre-load adjustment device. Adjusting the pre-load pressure adjusts different spring characteristics or pressure levels for these spring characteristics.

A positioning device, the pressure adjustment device, and/or the pre-load adjustment device preferably receive position set-point targets or actual position values for the respective medium spaces from a central or remote controller. Different force-stroke characteristics of the actuating part can then be realized, and preferably can be altered during operation of the turbine valve actuator. These targets can also be provided from a control room in running operation. Whereas safety devices known in the prior are only able to produce degressive characteristics through Belleville washers, the turbine valve actuator according to the invention now allows producing progressive, linear, constant (isobaric), or even regressive force-stroke characteristics. Thus, for example, with an isobaric characteristic, the pressure consumed from the hydraulic accumulator as an energy accumulator can be adjusted to a nearly constant level via the traveling of the actuating part. Different pressure levels can then be advantageously selected.

Preferably, the pressure of the actuating part can be determined by a preferably integrated and/or redundant displacement measurement device. Thus, the desired pressure can be defined in the second medium space. The displacement measurement here allows, in a particularly simple manner, monitoring the turbine valve actuator. Furthermore, sensors for measuring the pressure and/or temperature can be provided at the second medium space. During movement of the piston rod unit, the availability of closing force can be constantly monitored through the evaluation by the sensor measurement results, because all of the state variables of the hydraulic accumulator can be provided with the pressure, temperature, and derived volume.

Particularly advantageously, the supply device for the first medium space, in an actuating drive, comprises a pressure-controlled axial piston pump having a swivel angle adjustment. Alternatively, in a switching drive, the supply device comprises a gear pump having a constant delivery volume. The supply device cooperates with the positioning device. If the supply device comprises an axial piston pump, then a proportional valve is provided in the positioning device. If the supply device comprises a gear pump, then the positioning device has a control valve. To conserve energy, the gear pump can be switched off after a desired pressure is reached and switched on only when needed (accumulator charging).

The supply device may further comprise an additional hydraulic accumulator as a part of an accumulator charge circuit. The volume accumulated in the additional hydraulic accumulator corresponds to at least one reserve stroke of the actuating part drive. This additional hydraulic accumulator enables a particularly energy-saving operation of the supply device, because the electric motors that drive the pumps, in particular when maintaining a position, can be switched off temporarily.

The hydraulic accumulators are preferably designed as piston accumulators. Piston accumulators are distinguished by a high degree of gas tightness. More preferably, piston accumulators having welded covers are used. The piston accumulator can be monitored very easily during running operation, because the pressure on the gas side corresponds to the pressure on the fluid side. The calculation is based on real gas laws. For detecting the gas state quantities of pressure (p), volume (V), and temperature (T), the above-mentioned displacement device for measurement of the oil pressure on the cylinder stroke and thus of the pressure gradient can be used, as can the other sensors that are connected to the second medium space.

Particularly advantageously, a plurality of hydraulic accumulators can be connected in parallel, to enhance the failure safety through redundancy on one hand and increase the capacity on the other.

A fluid discharge line can be connected to the first medium space. The fluid discharge line can be actively locked by a safety controller with a safety valve, and permits discharging of the fluid in the direction of the tank. Thus, the fluid pressure in the first medium space can be released in a controlled manner through a safety controller, preferably with an interchangeable control valve assembly and a safety valve. In the blocked position, the outflow of fluid from the first medium space is prevented by the fluid discharge line, such that a pressure build-up is enabled in the first medium space. The release from the first medium space takes place in accordance with the closed circuit principle. The safety controller can be triggered by a control valve assembly in n-out-of-m (n-oo-m) logic, preferably by a control valve assembly in a 1-oo-2 logic or 2-oo-3 logic. In a 1-oo-2 logic, at least one logical unit of two must be switched off to open the safety valve. In a 2-oo-3 logic, at least two logical units must be switched off to open the safety valve. The safety valve assembly is advantageously interchangeable, to be able to equip the turbine valve actuator optionally with a control valve assembly of the 1-oo-2 logic or the 2-oo-3 logic and even be able to interchange these with one another later. The safety valve assembly enables a partial stroke test expediently. An embodiment of the 2-oo-3 logic with a partial stroke test is described in the above-mentioned patent document DE 10 2004 042 891 B3.

Preferably, non-contact limit switches are used for monitoring the piston rod unit in the cylinder housing.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
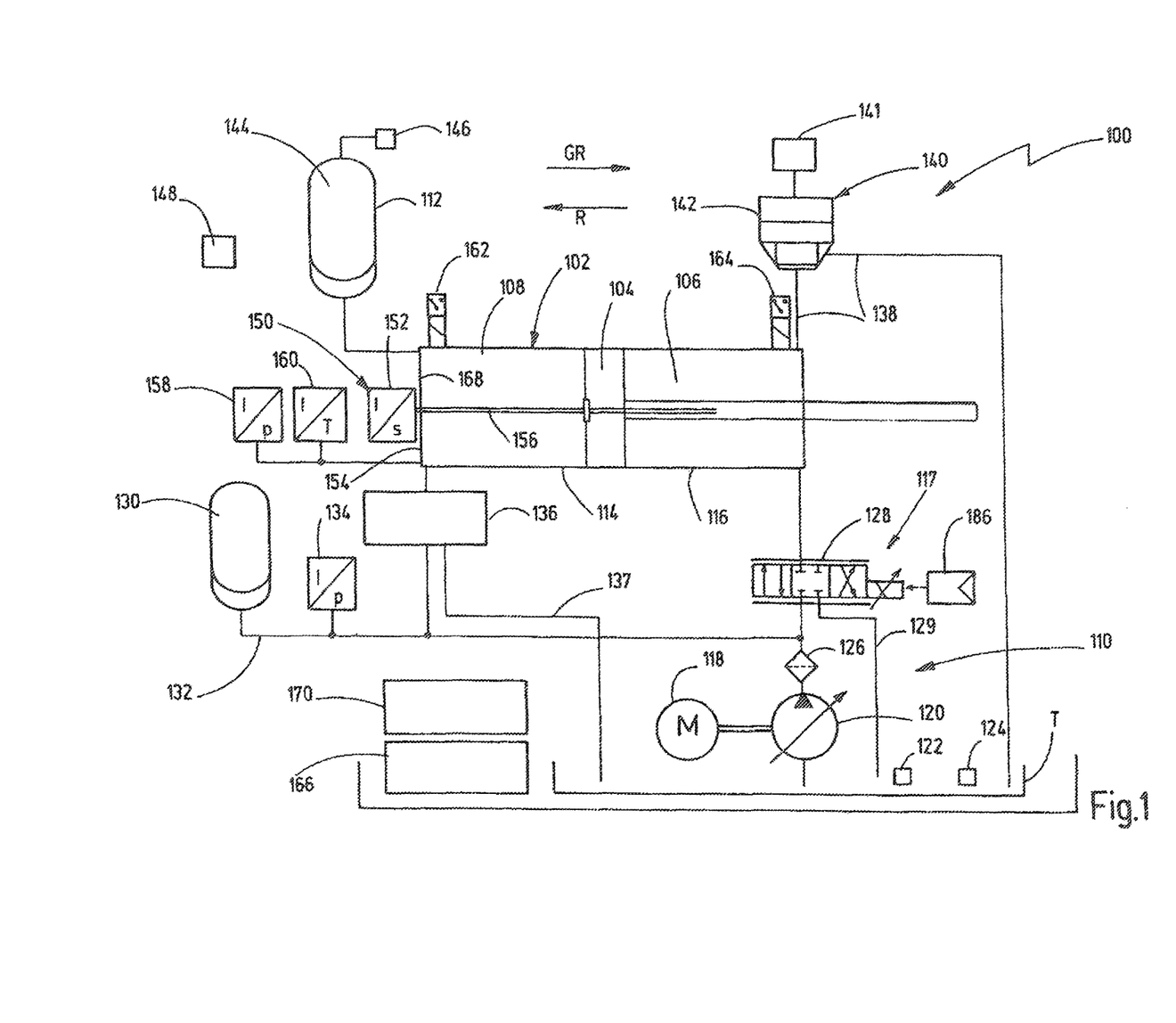
FIGS. 1 to 3 illustrate schematic diagrams of turbine valve actuators according to first, second and third exemplary embodiments, respectively, of the invention.
Figure 2:
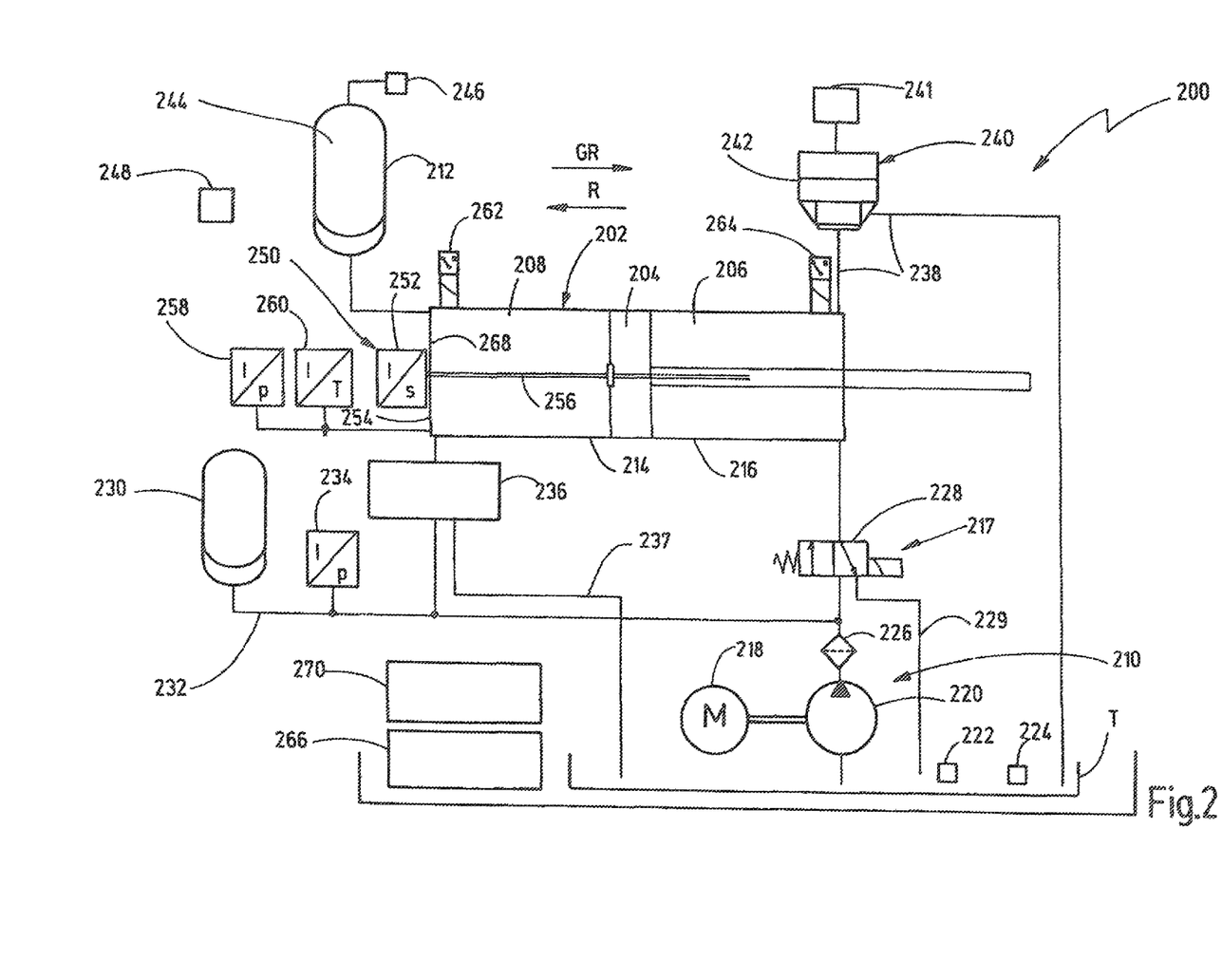
Figure 3:
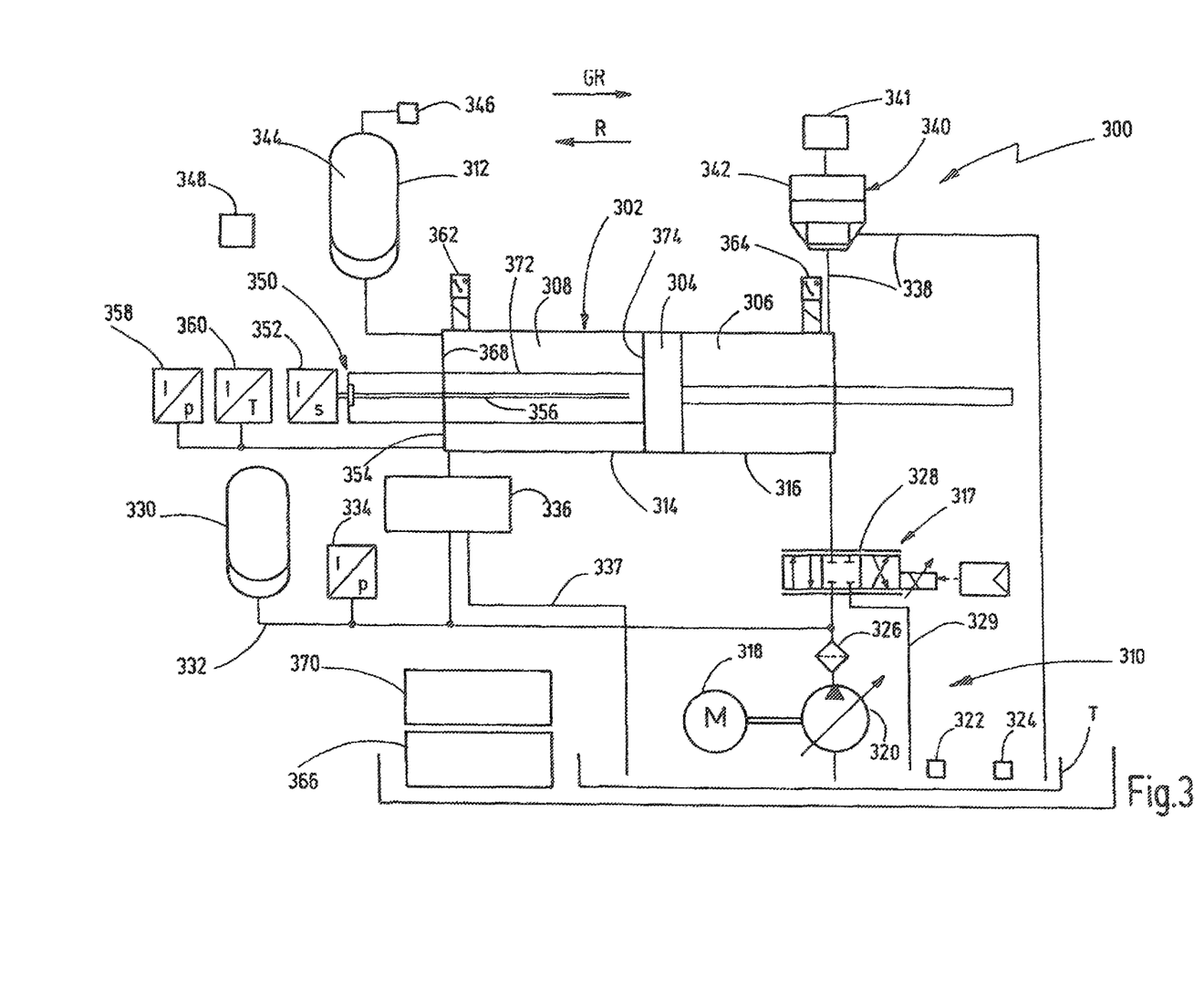

FIGS. 1 to 3 illustrate three exemplary embodiments of turbine valve actuators 100, 200, 300 according to the invention, for driving at least one valve unit (not shown) of a medium-operated consumer unit, such as a steam or gas turbine. The turbine has an actuating part drive 102, 202, 302, which comprises a movable actuating part 104, 204, 304, a first medium space 106, 206, 306, and a second medium space 108, 208, 308. A pressure build-up in the first medium space 106, 206, 306 attempts to cause or causes movement of the actuating part 104, 204, 304 in a first direction R. A pressure build-up in the second medium space 108, 208, 308 attempts to cause or causes movement of the actuating part 104, 204, 304 in an opposing second direction GR. The first medium space 106, 206, 306 can be supplied with a fluid in predeterminable amounts by a supply device 110, 210, 310. The second medium space 108, 208, 308 is acted upon by an energy accumulator 112, 212, 312. The energy accumulator is, according to the invention, a hydraulic accumulator 112, 212, 312 provided with a pre-load pressure, which is permanently connected to the second medium space 108, 208, 308.

The actuating part drive 102, 202, 302 is formed by a hydraulic working cylinder 114, 214, 314. In the hydraulic working cylinder 114, 214, 314, the first medium space 106, 206, 306 forms a rod working space, and the second medium space 108, 208, 308 forms a piston working space within a cylinder housing 116, 216, 316. The spaces formed are separated from one another by a piston rod unit as an actuating part 104, 204, 304. The hydraulic working cylinder 114, 214, 314 is constructed such that an extension of the piston rod unit 104, 204, 304 causes a closing of a downstream valve unit, so that a mass flow of stream to a medium-operated consumer unit is interrupted. To close the valve unit in a fail-safe operation, the piston rod unit 104, 204, 304 therefore extends due to the pre-load pressure of the hydraulic accumulator 112, 212, 312 relative to the cylinder housing 116, 216, 316, if the fluid pressure falls in the first medium space 106, 206, 306.

The first medium space 106, 206, 306 can be supplied with the supply unit 110, 210, 310, which cooperates with a positioning device 117, 217, 317. As illustrated in FIGS. 1 and 3, an axial piston pump 120, 320 having a swivel angle adjustment can be driven with an electric motor 118, 218, 318. The axial piston pump 120, 320 draws fluid out from a tank T. For safety, the tank T comprises a temperature sensor 122, 222, 322 and a fill level sensor 124, 224, 324. The fluid is forced through a filter 126, 226, 326 on the way to a proportional valve 128, 328. With the proportional valve 128, 328 of the positioning device 117, 217, 317, which is a 4/3-way valve, or operated as a 3/3-way valve, the first medium space 106, 206, 306 can be supplied with fluid. The pressure in the first medium space 106, 206, 306 may, however, also be maintained. In the crossed setting, the proportional valve 128, 328 permits a discharging of the first medium space 106, 206, 306 in the direction of the tank T via a fluid line 129, 229, 329. Between the filter 126, 226, 326 and the proportional valve 128, 328, an additional or second hydraulic accumulator 130, 230, 330 is connected as a buffer accumulator. The fluid pressure in the line 132, 232, 332, which leads to the additional hydraulic accumulator 130, 230, 330, is monitored via a pressure sensor 134, 234, 334.

Also connected to this line 132, 232, 332 is a pressure adjustment device 136, 236, 336, with which it is possible to adjust the fluid pressure in the second medium space 108, 208, 308. The pressure adjustment device 136, 236, 336 comprises a fluid line 137, 237, 337 to the tank T for relieving the second medium space 108, 208, 308. With the pressure adjustment device 136, 236, 336, the fluid pressure in the second medium space 108, 208, 308 can be adjusted to a minimum pressure in such a manner that the actuating part 104, 204, 304 moves in the unpressurized first medium space 106, 206, 306 in the second direction GR to an end position. This minimum pressure corresponds at least to the minimum actuating force of the actuating part drive 102, 202, 302 at the extended actuating part 104, 204, 304. Upon retraction of the actuating part 104, 204, 304, the pressure in the second medium space 108, 208, 308 of the working cylinder 114, 214, 314 rises. The maximum pressure in the second medium space 108, 208, 308 is, however, limited by the pressure adjustment device 136, 236, 336.

Furthermore, a fluid discharge line 138, 238, 338 from the first medium space 106, 206, 306 in the direction of the tank T is provided. This fluid discharge line 138, 238, 338 can be actively locked by a safety controller 140, 240, 340 having a control valve assembly in a n-oo-m logic 141, 241, 341 and a safety valve 142, 242, 342. The safety controller 140, 240, 340 ensures that the downstream valve unit is only opened if the safety valve 142, 242, 342 is actively locked, because only then can a pressure build-up take place in the first medium space 106, 206, 306.

The pre-load pressure on a gas side 144, 244, 344 of a hydraulic accumulator 112, 212, 312 is adjusted by a pre-load adjustment device 146, 246, 346.

The positioning device 127, 227, 327, the pressure adjustment device 136, 236, 336, and optionally the pre-load adjustment device 146, 246, 346 receive position set-point targets $x_{soll}$ (FIG. 6) or actual position values $x_{ist}$ from a (central or remote) controller 148, 248, 348 for the respective medium spaces 106, 108; 206, 208; 306, 308. Different force-stroke characteristics of the actuating parts 104, 204, 304 can then be realized, as shall be described in greater detail below.

Various sensors are provided to monitor the turbine valve actuator 100, 200, 300. The position of the piston rod unit 104, 204, 304 can be detected with a displacement measurement device 150, 250, 350. The displacement measurement device 150, 250, 350 comprises a sensor 152, 252, 352 on a rear side 154, 254, 354 of the working cylinder 114, 214, 314. This sensor detects the position of the piston rod unit 104, 204, 304 via a rod 156, 256, 356 coupled to the piston rod unit 104, 204, 304. In addition, a pressure sensor 158, 258, 358 and a temperature sensor 160, 260, 360 are connected to the second medium space 108, 208, 308. Additionally, non-contact limit switches 162, 164; 262, 264; 362, 364 for monitoring the position of the piston rod unit 104, 204, 304 in the working cylinder 114, 214, 314 are provided. All of the sensors are coupled to the central or remote controller 148, 248, 348.

Figure 4:
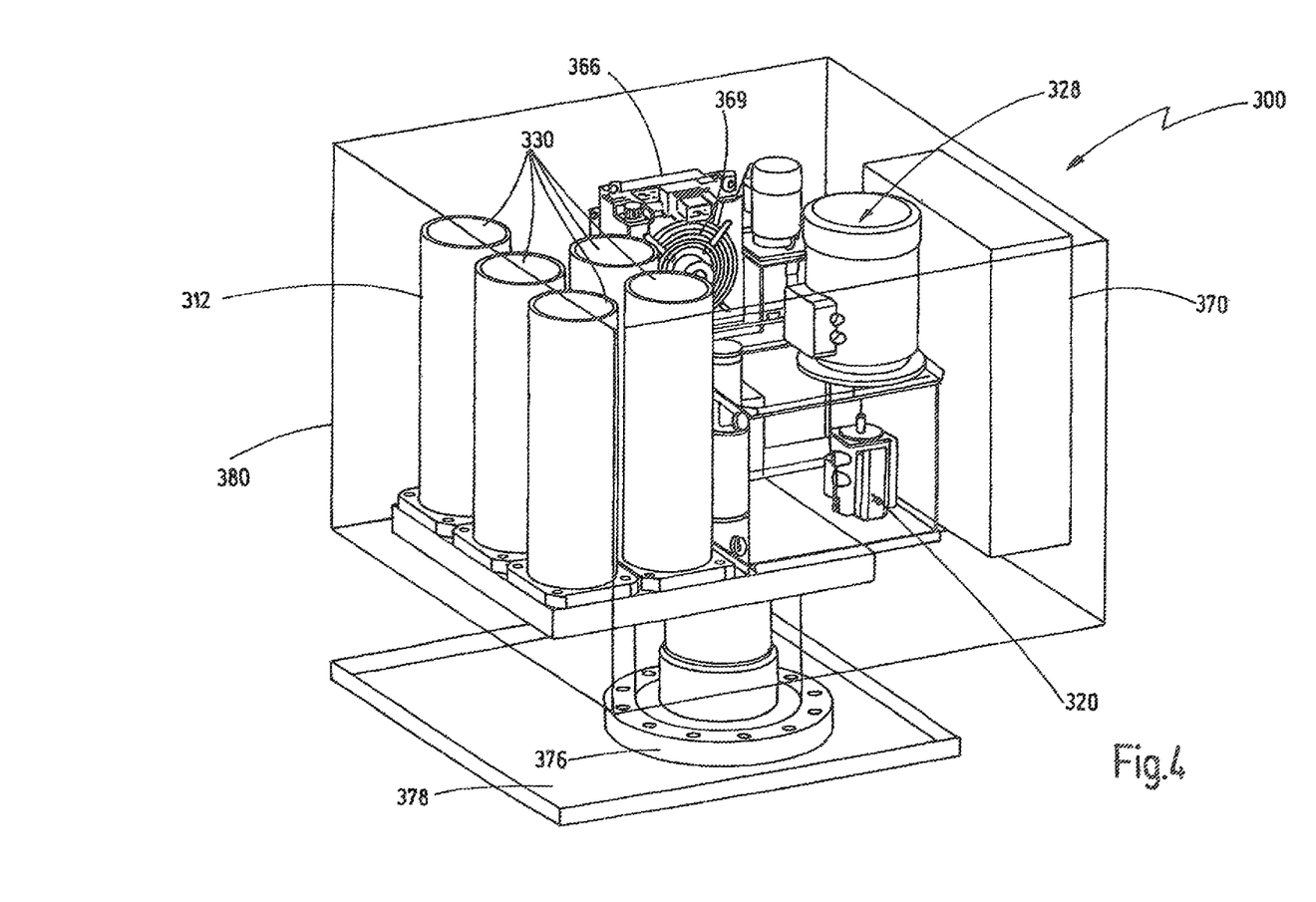
FIGS. 4 and 5 are two perspective views of the turbine valve actuator according to the third exemplary embodiment of the invention, which are rotated 180° relative to one another.

To cool the turbine valve actuator 100, 200, 300 and the circulating fluid, a cooling unit 166, 266, 366 is provided. The working cylinder 114, 214, 314 and the fluid are tempered by a self-sufficient, self-contained refrigeration cycle. Water-glycol is used as the operating medium. The cylinder bottom 168, 268, 368 of the working cylinder 114, 214, 314 is provided with cooling channels. The tank T comprises cooling coils. In this manner, the external heat output from the valve unit into the fluid at the entry point is reduced. Heat is exchanged with the ambient air by a cooling air blower 369 (FIG. 4).

The electrical components are coupled via a terminal board 170, 270, 370.

The embodiment of FIG. 2 differs from the embodiment of FIG. 1 only in that the supply device 210 comprises a gear pump 220 having a constant delivery volume, instead of an axial piston pump 120. A positioning device 217 comprises a direction-switching valve 228 instead of a proportional valve 128.

FIG. 3 illustrates an embodiment of the turbine valve actuator 300 in particular for diverter valves. This embodiment is based on the embodiment of FIG. 1 and comprises a working cylinder 314 with which the piston rod unit 304 in the second medium space 308 comprises an extension 372, which extends through a cylinder bottom 368 of the working cylinder 314. In this manner, the surface 374 of the piston rod unit 304 in the second medium space 308 that can be acted upon with fluid is reduced.

Figure 5:
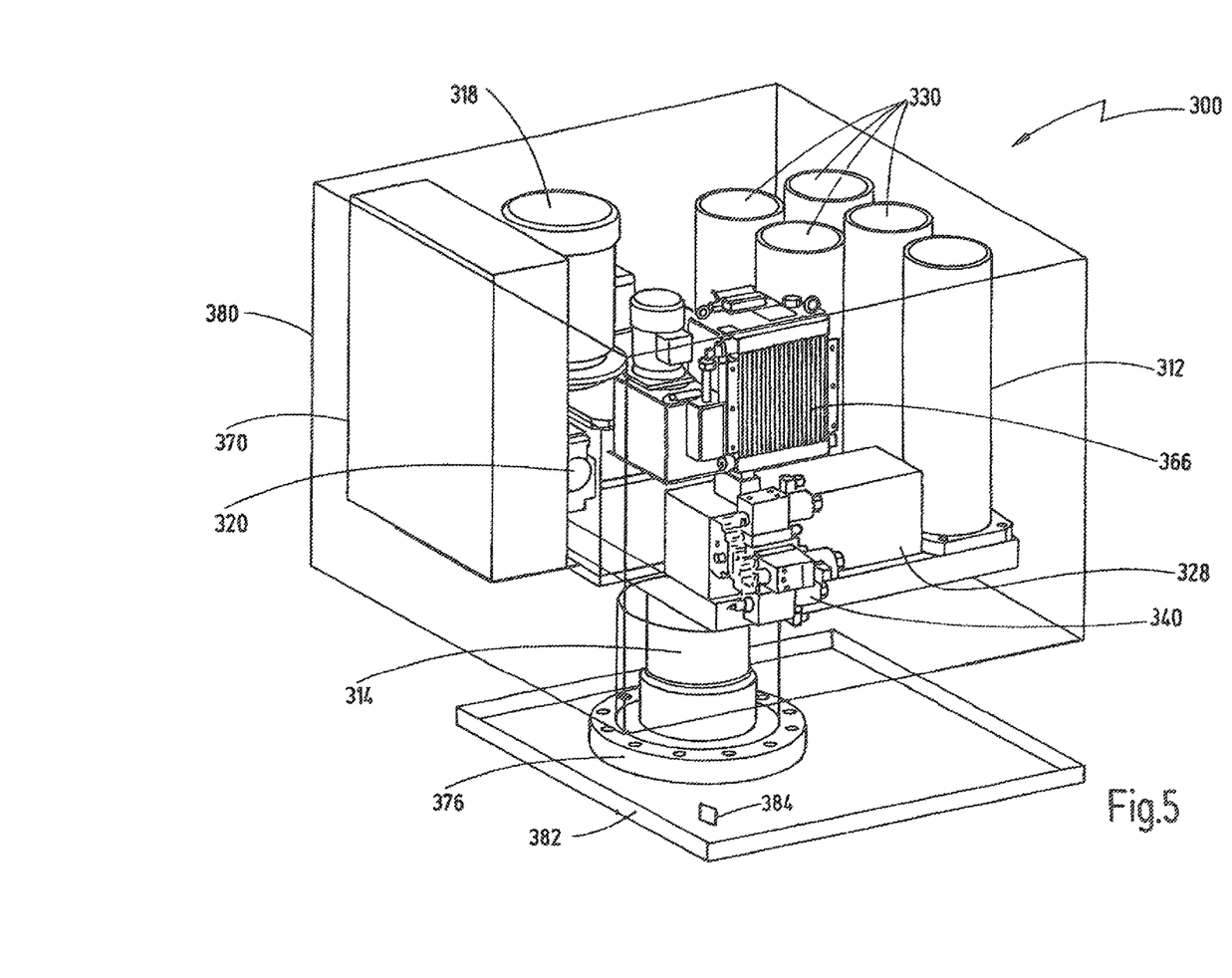

FIGS. 4 and 5 illustrate the structure of the turbine valve actuator 300 in perspective views, which are rotated 180° relative to one another. The working cylinder 314 is fastened therein by a flange plate 376 on a valve unit. The components of the actuating part drive are compactly disposed within narrow installation space boundaries 380. The hydraulic accumulator 312 and the additional hydraulic accumulator 330 are embodied as redundant piston accumulators with a welded lid. In addition, the electric motor 318 for driving the axial piston pump 320 can be seen. A cooling unit 336 comprising the cooling air blower 369 is disposed laterally. Below the cooling unit 366 is the safety controller 340. In the control block next to the safety controller 340, the proportional valve 328 is disposed. Below the turbine valve actuator 300, a fluid collecting tray 328 for the fluid with a monitoring contact 384 is disposed.

Figure 6:
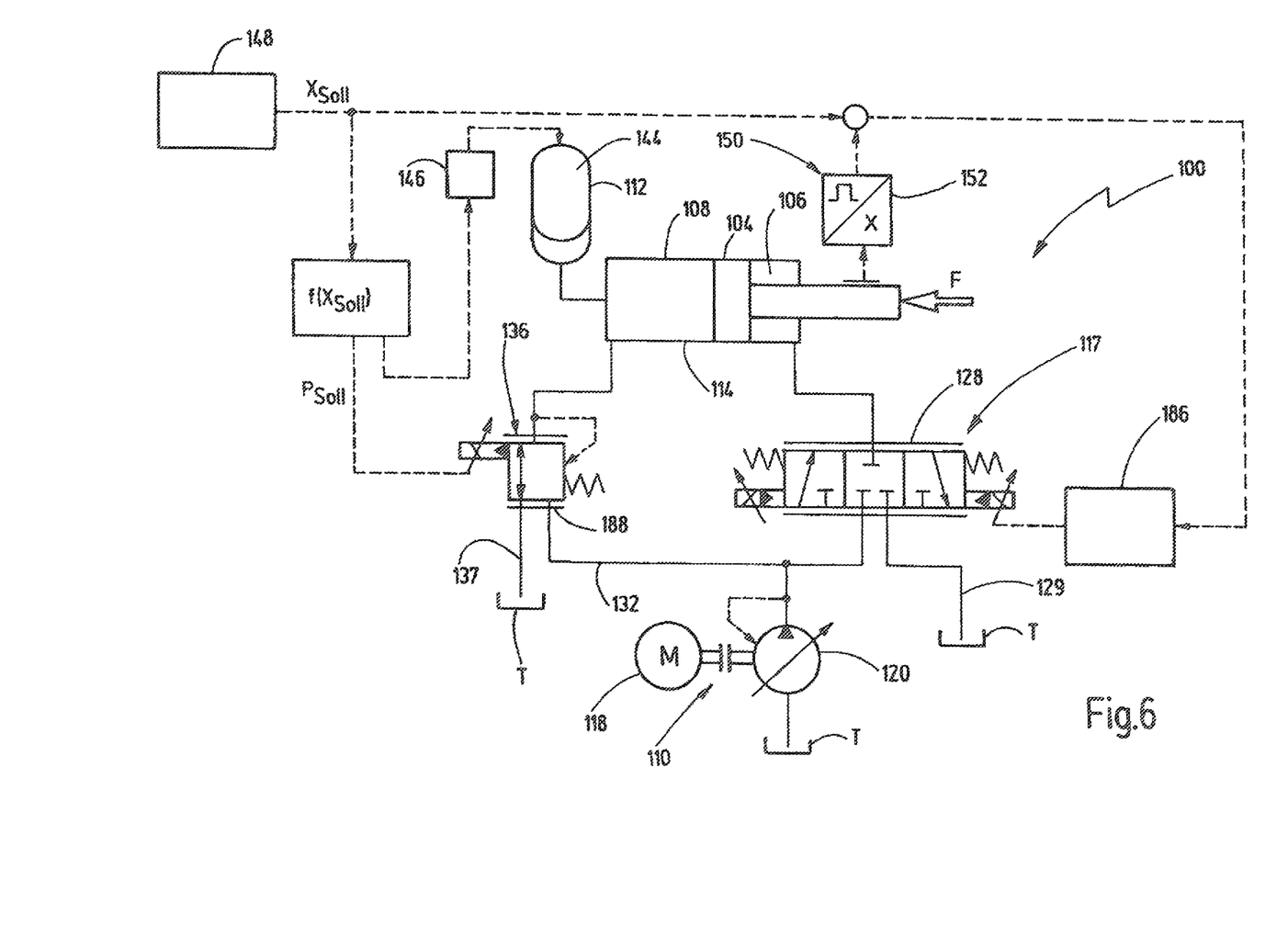
FIG. 6 illustrates a block diagram of a controller of a turbine valve actuator according to the invention.

FIG. 6 illustrates an exemplary block diagram of the control of the components of the turbine valve actuator 100. The central or remote controller 148 prescribes a position set-point value $x_{soll}$, which is compared with a position sensor 152 of the displacement measurement device 150 for the piston rod unit 104 of the working cylinder 114. A position regulator 186 of the proportional valve 128 of the positioning device 117 is controlled with the result of this comparison. The proportional valve 128 either connects the first medium space 106 of the working cylinder 114 to an axial piston pump 120, or enables a discharging of fluid in the direction of a tank T via the fluid line 129, or the existing pressure in the first medium space 106 is kept constant. Furthermore, the position set-point value $x_{soll}$ or the actual position value $x_{ist}$ can be translated into a pressure set-point target $p_{soll}$, which then serves to control a proportional pressure valve 188 of the pressure adjustment device 136, through which the fluid pressure in the second medium space 108 can be adjusted. The pressure adjustment device 136 is also connected to the axial piston pump 120 or the tank T, allowing selective raising or lowering of the pressure in the second medium space 108. Additionally, the pre-load adjustment device 146 that is provided can also be supplied with a pressure target $p_{soll}$ and adjusts the pre-load pressure on the gas side 144 of the hydraulic accumulator 112.

Figure 7:
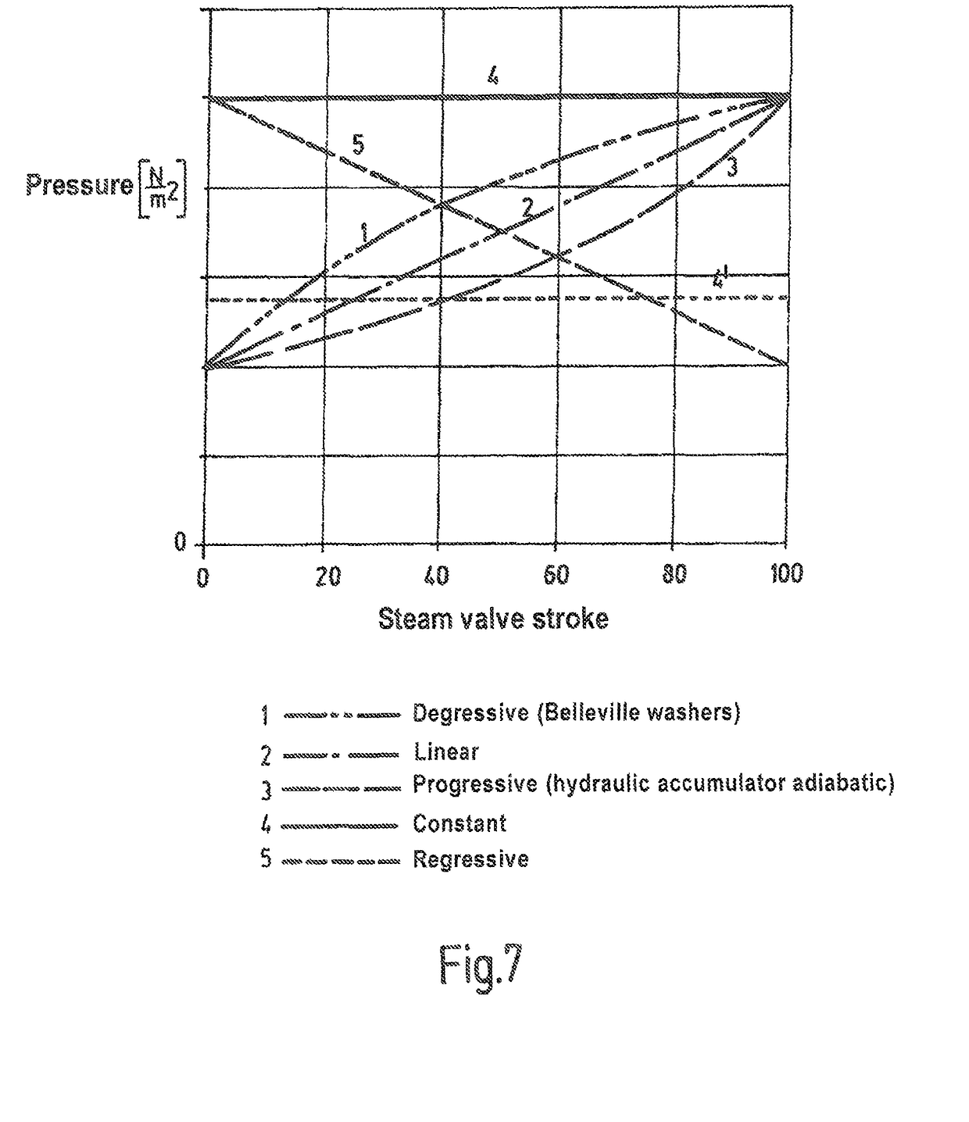
FIG. 7 is a graph illustrating a comparison of possible, producible force-stroke characteristics of the actuating part.

FIG. 7 shows that the combined use of the positioning device 117, 217, 317, the pressure adjustment device 136, 236, 336, and the pre-load adjustment device 146, 246, 346 permitting implementing different force-stroke characteristics 1-5 of the actuating part.

Analogously to Belleville washers, the turbine valve actuator 100, 200, 300 can be adjusted to have a degressive characteristic 1. It can also be set for a linear characteristic 2, a progressive characteristic 3, a constant (isobaric) characteristic at different levels 4, 4', or a regressive characteristic 5. Thus, the turbine valve actuator can be optimally adapted to the required force profiles, as they must be adjusted to, for example, in different operating conditions. Also, for can be adaptively limited. Because the characteristic can be easily changed through a set-point target, an adjustment can be made during running operation, from a control room.

The turbine valve actuators 100, 200, 300 according to the invention have various advantages, in particular a high modularity and adaptability through the external hydropneumatic springs in the form of the hydraulic accumulator 112, 212, 312. The modular design permits interchanging or later replacing the components and complete subsystems, such as, for example, the supply device 110, 210, 310 or the cooling unit 166, 266, 366. There is lower driving variant diversity, and many identical parts can be used. The availability can be enhanced through redundancy, e.g., the hydraulic accumulators 112, 130; 212, 230; 312, 330. The turbine valve actuators 100, 200, 300 are further distinguished by having a high flexibility through a force level adaptation, which can be adjusted even during the operation from a control room. In this manner, different force-stroke characteristics can be adjusted to during running operation. The piston accumulator types that are used entail sophisticated series components with a design for durability. The high reliability of the hydraulic accumulators 112, 130; 212, 230; 312, 330 is achieved through a gas-side welded cover and a low-friction sealing system. The hydropneumatic springs and the redundant use of piston accumulators ensures a high reliability of the turbine valve actuator at low costs in production and in the running operation. In all, the turbine valve actuators 100, 200, 300 according to the invention thus possess considerable advantages over the turbine valve actuators of mechanical springs known in the prior art.

While various embodiments have been chosen to illustrate the invention, it will be understood by those skilled in the art that various changes and modifications can be made therein without departing from the scope of the invention as defined in the claims.

The invention claimed is:

1. A turbine valve actuator for controlling a valve unit of turbine, the turbine valve actuator comprising:
   an actuating drive including a movable actuating part, a first medium space and a second medium space, said actuating part being movable by a fluid pressure build-up in said first medium space in a first direction and by a fluid pressure build-up in the second medium space in a second direction opposite to the first direction, said first medium space not being connected in fluid communication with an accumulator without a valve therebetween;
   a pressure supply device in fluid communication with said first medium space and adapted to supply a fluid in predeterminable amounts to said first medium space, said pressure supply device including at least one of an axial piston pump or a gear pump;
   a tank;
   a first hydraulic accumulator with a pre-load pressure permanently connected in fluid communication with said second medium space and adapted to supply fluid pressure to said second medium space; and
   a pressure adjustment device connected in fluid communication with at least one of said axial piston pump or said gear pump and with said tank for selectively raising or lowering pressure in said second medium space.

2. A turbine valve actuator according to claim 1 wherein said actuating drive comprises at least one of a hydraulic motor or a hydraulic working cylinder.

3. A turbine valve actuator according to claim 1 wherein said actuating drive comprises a hydraulic working cylinder having a rod working space forming said first medium space and a piston working space forming said second medium space within a cylinder housing, said rod working space and said piston working space being separated from one another by a piston rod unit forming said actuating part.

4. A turbine valve actuator according to claim 3 wherein said piston rod unit at least one extends or retracts relative to said cylinder housing due to the pre-load pressure of said hydraulic accumulator in said second medium space upon a fluid pressure drop in said first medium space to close the valve unit in a fail-safe operation.

5. A turbine valve actuator according to claim 1 wherein said pressure adjustment device is connected in fluid communication with said second medium space and adjusts fluid pressure in said second medium space between a minimum pressure and a maximum pressure moving said actuating part in the second direction to an end position thereof when said first medium space is unpressurized such that exceeding of allowable driving forces is prevented.

6. A turbine valve actuator according to claim 5 wherein a pre-load adjustment device is connected in fluid communication with a gas side of said first hydraulic accumulator and adjusts the pre-load pressure of said first hydraulic accumulator.

7. A turbine valve actuator according to claim 6 wherein at least one of a positioning device in fluid communication with and controlling fluid flow to and from said first medium space, said pressure adjustment device or said pre-load adjustment device is connected to and receives at least one of set-point targets or actual position values from a central controller for the respective medium spaces such that different force-stroke characteristics of said actuating part can be altered, even during operation of the turbine valve actuator.

8. A turbine valve actuator according to claim 7 wherein the pre-load pressure of said first hydraulic accumulator is adjustable to a substantially constant level via travel of said actuating part.

9. A turbine valve actuator according to claim 1 wherein a displacement measurement device is connected to said actuating part and provides signals of positions of said actuating part determining a desired pressure in said second medium space.

10. A turbine valve actuator according to claim 1 wherein said pressure supply device comprises said axial piston pump having an adjustable swivel angle; and
a proportional valve is in fluid communication with and between said axial piston pump and said first medium space.

11. A turbine valve actuator according to claim 1 wherein said pressure supply device comprises said gear pump having a constant delivery volume; and
a control valve is in fluid communication with and between said gear pump and said first medium space.

12. A turbine actuator according to claim 1 wherein a safety controller is in fluid communication with said first medium space and relieves fluid pressure in said first medium space in a controlled manner.

13. A turbine actuator according to claim 12 wherein said safety controller comprises an interchangeable control valve assembly and a safety valve.

14. A turbine valve assembly according to claim 13 wherein
said control valve assembly is embodied in a n-oo-m logic.

15. A turbine valve device according to claim 14 wherein said n-oo-m logic is at least one of a 1-oo-2 logic or a 2-oo-3 logic.

16. A turbine valve device according to claim 14 wherein said control valve assembly allows a partial stroke test.

17. A turbine actuator according to claim 1 wherein a proportional valve is in fluid communication with and between said pressure supply device and said first medium space by a conduit; and
a second hydraulic accumulator is connected in fluid communication with said conduit between said proportional valve and said pressure supply device.

18. A turbine actuator according to claim 1 wherein said first medium space is connected in fluid communication to said tank via only a single valve.

19. A turbine valve actuator for controlling a valve unit of turbine, the turbine valve actuator comprising:
an actuating drive including a movable actuating part, a first medium space and a second medium space, said actuating part being movable by a fluid pressure build-up in said first medium space in a first direction and by a fluid pressure build-up in the second medium space in a second direction opposite to the first direction, said first medium space not being connected in fluid communication with any accumulator without a valve therebetween;
a pressure supply device in fluid communication with said first medium space and adapted to supply a fluid in predeterminable amounts to said medium space;
a first hydraulic accumulator with a pre-load pressure permanently connected in fluid communication with said second medium space and adapted to supply fluid pressure to said second medium space; and
a pressure adjustment device being connected in fluid communication with said second medium space and adjusting fluid pressure in said second medium space between a minimum pressure and a maximum pressure moving said actuating part in the second direction to an end position thereof when said first medium space is unpressurized such that exceeding of allowable driving forces is prevented.

20. A turbine valve actuator according to claim 19 wherein
a pre-load adjustment device is connected in fluid communication with a gas side of said first hydraulic accumulator and adjusts the pre-load pressure of said hydraulic accumulator.

21. A turbine valve actuator according to claim 20 wherein
at least one of a positioning device in fluid communication with and controlling fluid flow to and from said first medium space, said pressure adjustment device or said pre-load adjustment device is connected to and receives at least one of set-point targets or actual position values from a central controller for the respective medium spaces such that different force-stroke characteristics of said actuating part can be altered, even during operation of the turbine valve actuator.

22. A turbine valve actuator according to claim 21 wherein
the pre-load pressure of said first hydraulic accumulator is adjustable to a substantially constant level via travel of said actuating part.

23. A turbine actuator according to claim 19 wherein a proportional valve is in fluid communication with and between said pressure supply device and said first medium space by a conduit; and
a second hydraulic accumulator is connected in fluid communication with said conduit between said proportional valve and said pressure supply device.

24. A turbine actuator according to claim 19 wherein said first medium space is connected in fluid communication to said tank via only a single valve.

* * * * *